Aug. 28, 1962 F. M. ASPIN 3,051,156
INTERNAL COMBUSTION ENGINES, COMPRESSORS AND THE LIKE
Filed Oct. 24, 1960

INVENTOR:
Frank M. Aspin
BY
Bierman + Bierman
Attorneys

United States Patent Office 3,051,156
Patented Aug. 28, 1962

3,051,156
INTERNAL COMBUSTION ENGINES,
COMPRESSORS AND THE LIKE
Frank Metcalf Aspin, Thornleigh, Peover Lane,
Chelford, England
Filed Oct. 24, 1960, Ser. No. 64,430
3 Claims. (Cl. 123—190)

This invention relates to internal combustion engines, compressors and the like of the kind having a rotary valve member and a driving member for rotating the same, the valve and its housing having complementary conical seating surfaces so directed so as to be loaded by the internal pressures. The invention is particularly, though not exclusively, applicable to internal combustion engines having a rotary valve.

With a rotary valve of the kind referred to, it is a fundamental principle for several reasons that there shall be freedom for relative axial movement of the valve in its housing, so that for one reason, the pressures at the conical sealing and seating surfaces shall be a function, at least in part, of the gaseous pressures against which sealing is required, as such pressures fluctuate tremendously. Thereby, the need for continuous high axial loading pressure at such surfaces is avoided.

Attempts have been made to balance or oppose the axial loads by fluid pressures, but this has proved impractical for reasons, inter alia, the time lag before the balancing pressure becomes effective.

The present invention is based upon an appreciation that, with a rotary valve of the kind referred to, relatively high frictional losses are, in fact, incurred at such conical surfaces, though this is not necessarily evidenced by wear or other local indications.

The invention has, for its object, an improved construction of rotary valve to oppose the axial loads thereon deriving from gaseous pressure in such manner as to maintain a seating load which is, at least in part, a function of the pressures causing such load, and thereby to enable a minimum loading of the said seating surfaces to obtain an effective fluid seal at all times.

According to the invention, a rotary valve for the cylinder of an internal combustion engine comprises a valve housing located at the combustion end of the cylinder with conical valve seating therein, the base of the cone being presented to the engine cylinder, a complementary conical valve member rotatably mounted therein, the said valve housing and valve member having complementary ports, a driving member for the rotary valve member, thrust bearing means between the said driving member and the said housing arranged to take thrust in a direction away from the engine cylinder, and driving coupling means, between said driving member and said rotary valve member, permitting axial and rotary relative movement engendering an axial thrust component on the said valve member and thrust bearing as a function of the driving torque.

In a preferred embodiment of the invention a rotary valve for the cylinder of an internal combustion engine of the kind comprising a valve housing located at the combustion end of the engine cylinder said housing having a conical valve seating the larger end of which is open to, and covers, the major portion of the said end of the cylinder and preferably co-axial therewith, said seating being formed with suitably located inlet and exhaust ports, a complementary conical rotary valve member mounted in said seating and having a passage, opening at the conical surface as a port complementary to the inlet and exhaust ports aforesaid and at the other end to the underface of the valve member, said passage being adapted to form the major portion of the combustion volume of the engine at the moment of maximum compression, a driving member for said rotary valve member, a thrust bearing between said driving member and the valve housing arranged to take thrust in a direction away from the engine cylinder and driving coupling means, between said driving member and the rotary valve member permitting axial and rotary relative movement engendering on axial thrust component on the said valve member and thrust bearing as a function of the driving torque.

Figure 1:
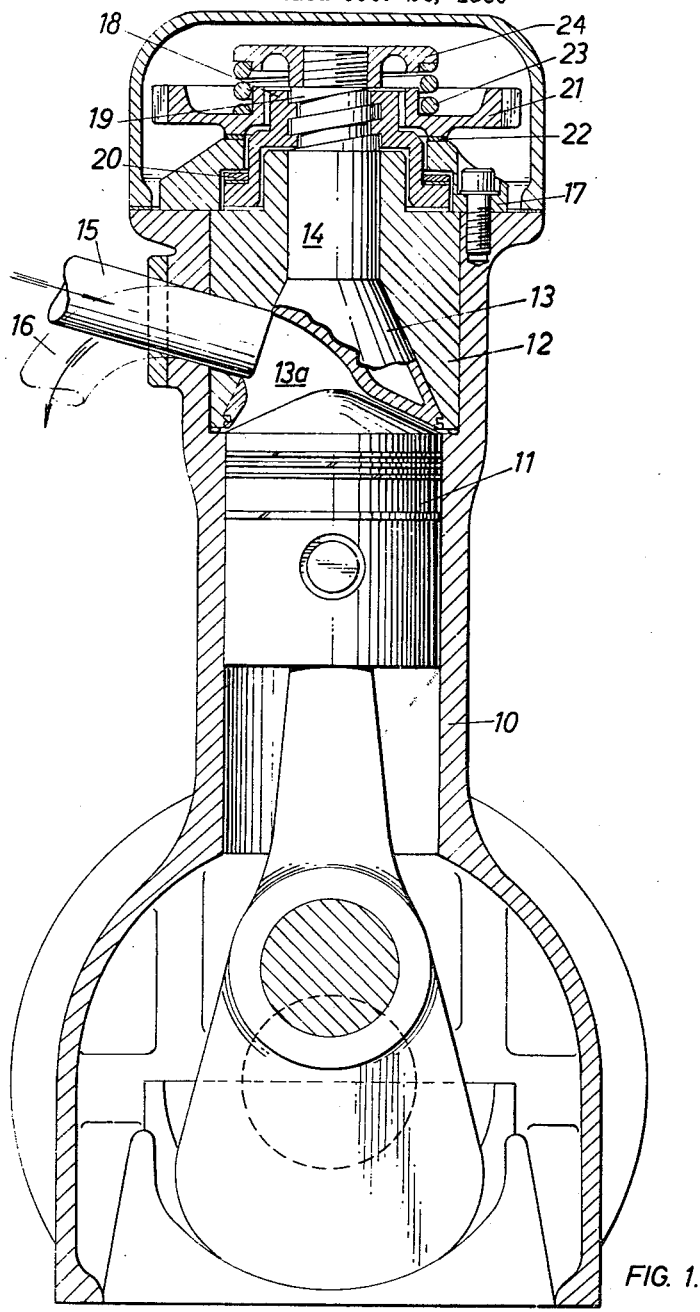
FIG. 1 is a diagrammatic sectional elevation of one example of a single cylinder internal combustion engine having a rotary valve made in accordance with the present invention.

As shown in FIG. 1, the engine comprises a cylinder block 10 with piston 11. In the head of the cylinder block is a stationary valve housing 12 for a rotary valve having a conical lower end 13 and stem 14. Within the lower end of the valve is the combined combustion space and passage 13a for the entry and outflow of the products for, and of, combustion through inlet and exhaust passages 15 and 16.

In the example shown in FIG. 1, on the top of the cylinder block is secured a rigid cap 17 to form an abutment for a driving collar 18 which is connected to the upper end of the valve stem by a helix at 19. Between the cap 17 and the driving collar is a needle thrust race 20. The upper end of the sleeve of collar 18 is splined for driving connection to a gear pinion 21 supported on a thrust washer 22 on the top of the cap 17. A constant upward pull on the valve stem and downward thrust on the pinion 21 is provided by means of a spring 23 and thrust cap 24 secured to the upper end of the valve stem.

In a specific example of an internal combustion engine with rotary valve mechanism above described and illustrated diagrammatically, the engine has a bore of 73 mm. and stroke 65 mm. The included angle of the concial portion of the rotary valve is 50 degrees with its base end just larger than the cylinder bore, and the engine is designed to have a peak pressure of about 77.4 kilogrammes per square cm. The helix on the upper end of the valve stem has a 15 degree angle with an outside diameter of about 32 mm. The coefficient of friction of the needle thrust race is of the order of 0.004 or less.

The most suitable angle of the cone as determined by many experiments is somewhere between 40 and 60 degrees and the main factors which determine this are considerations of friction and wear. A rotary valve of the above dimensions owing to pressure fluctuations, may move axially as much as 0.2 mm. and some such axial movement is essential to good working and hitherto, the driving splines which permitted such movement, have been parallel to the axis of rotation. Such axial movement also represents, in this example, a relative rotation of the order of about 1 degree which is negligible, particularly as the maximum movement will always synchronise with a valve-closed, position.

Figure 2:
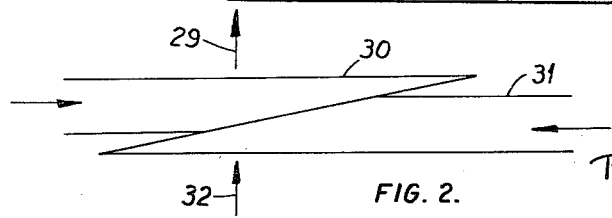
FIG. 2 is a theory diagram.

With the helical coupling splines, however, of the construction above described, an important new function results. As the axial loading of the valve increases with the pressure of combustion, the frictional resistance to rotation will increase in proportion to axial upward movement, but such movement is resisted through the helix and the thrust bearing by the driving torque applied to the sleeve through the pinion thereon and the drive for the rotary valve. The operative forces are illustrated diagrammatically in FIG. 2 in which the arrow 29 represents the upward thrust against the thrust bearing 22, the wedge 30 represents the splines in the sleeve and the wedge 31 represents the splines on the end of the valve. In operation, both wedges must be assumed to be moving together to the right. If an upward thrust is applied to the wedge 31 as indicated by the arrow 32, such as would be applied by the explosion pressure, upward movement of that wedge is only possible if it moves to the right i.e. in advance of the wedge 30 with relative sliding movement at the wedge faces, which represent the inclined splines, the wedge 30 being prevented from movement to the left by the gear drive from the crankshaft. All the time also, the torque applied to the wedge 30 to move it to the right produces movement of the wedge 31 to the right while the frictional resistance to such movement of the wedge 31 is less than the friction between the wedges 30 and 31. Consequently, the driving torque operates to oppose and relieve the load on the conical surfaces of the valve and housing, but only a portion thereof as the loading on the wedges (representing the driving splines) is also a function of the axial load on the valve. Such axial load is made up of the constant load of the spring and the fluctuating load of combustion pressures. It is, therefore, possible to co-relate the angles of the splines and conical surfaces to ensure that at all times, the effective pressure at such surfaces of the loads which they at present have to bear is in excess of those required to maintain a seal. The axial thrust component on the valve through the splines at any particular instant is clearly a function of the driving torque transmitted thereby.

The initial relations of the parts must be such that there is normally a small clearance or lost motion at the cam faces to allow axial movement of the valve but in operation, it functions in the same way to relieve unwanted loading of the conical surfaces of the valve.

Although the invention has been described and illustrated with reference to an internal combustion engine, it is obviously applicable to pumps, compressors and other such apparatus where a rotary valve can be used.

I claim:
1. In a rotary valve having a driving stem and a seat for said valve, the improvement which comprises a driving gear on said stem having freedom of relative axial and rotary movement, a thrust bearing for said driving gear, spring means between said gear and said stem for loading said valve onto said seat, said spring means having torsional as well as axial resilience, the said driving gear and driving stem also having complementary engaging driving formations providing transmission of rotational torque from the driving gear to the valve stem with the generation of a resultant axially directed force in a direction to ease the valve off its seat against the loading of the spring means.

2. A rotary valve according to claim 1 characterized in that the complementary driving formations between the driving gear and the driving stem of the rotary valve comprises complementary screw-and-nut thread formations.

3. A rotary valve according to claim 1 characterized in that said spring means is a coil spring.

References Cited in the file of this patent
UNITED STATES PATENTS

| | | |
|---|---|---|
| 1,072,812 | Bertram | Sept. 9, 1913 |
| 1,099,102 | Russell | June 2, 1914 |
| 1,134,124 | Guillery | Apr. 6, 1915 |
| 1,153,707 | Russell | Sept. 14, 1915 |
| 1,166,939 | Russell | Jan. 4, 1916 |
| 1,603,090 | Mecke | Oct. 12, 1926 |
| 1,966,246 | Jackson | July 10, 1934 |
| 2,387,143 | Gernandt et al. | Oct. 16, 1945 |
| 2,527,658 | Sinclair | Oct. 31, 1950 |